United States Patent [19]

Kobayashi et al.

[11] Patent Number: 5,153,790
[45] Date of Patent: Oct. 6, 1992

[54] RECORDING OR REPRODUCING APPARATUS HAVING A REEL BRAKING MEMBER

[75] Inventors: Junji Kobayashi; Makoto Fujiki; Hidetoshi Matsuoka, all of Tokyo; Hiroo Edakubo, Yokohama, all of Japan

[73] Assignee: Canon Kabushiki Kaisha, Japan

[21] Appl. No.: 499,635

[22] Filed: Mar. 27, 1990

[30] Foreign Application Priority Data

Mar. 28, 1989 [JP]  Japan .................................. 1-73803

[51] Int. Cl.$^5$ ................... G11B 15/00; G11B 15/665; G11B 15/675
[52] U.S. Cl. ...................................... 360/85; 360/95; 360/96.5
[58] Field of Search ............... 360/85, 95, 96.5, 84, 360/83, 81, 96.3

[56] References Cited

U.S. PATENT DOCUMENTS

| | | | |
|---|---|---|---|
| 4,639,797 | 1/1987 | Kobayashi et al. | 360/71 |
| 4,661,864 | 4/1987 | Kuwajima | 360/85 |
| 4,789,912 | 12/1988 | Masuda et al. | 360/85 |
| 4,917,328 | 4/1990 | Kobayashi et al. | 360/96.3 |
| 4,930,028 | 5/1990 | Kunimaru et al. | 360/85 |
| 4,949,203 | 8/1990 | Kunimaru et al. | 360/85 |

Primary Examiner—A. J. Heinz
Assistant Examiner—Craig A. Renner

[57] ABSTRACT

A recording or reproducing apparatus mounting a cassette housing a magnetic tape wound around a supply reel and a takeup reel, for performing an operation of moving the cassette in a predetermined direction, drawing the magnetic tape out of the cassette and loading the tape on a magnetic head unit, and for performing an operation of moving the cassette in a direction which is reverse to the above-described direction, taking up the tape around the takeup reel in the cassette and withdrawing the tape from the magnetic head unit. The apparatus includes structure for locking the supply reel in the cassette during the withdrawing operation and for releasing the lock during the loading operation. The locking/releasing structure is linked with the movement of the cassette during the loading and withdrawing operations of the magnetic tape.

14 Claims, 3 Drawing Sheets

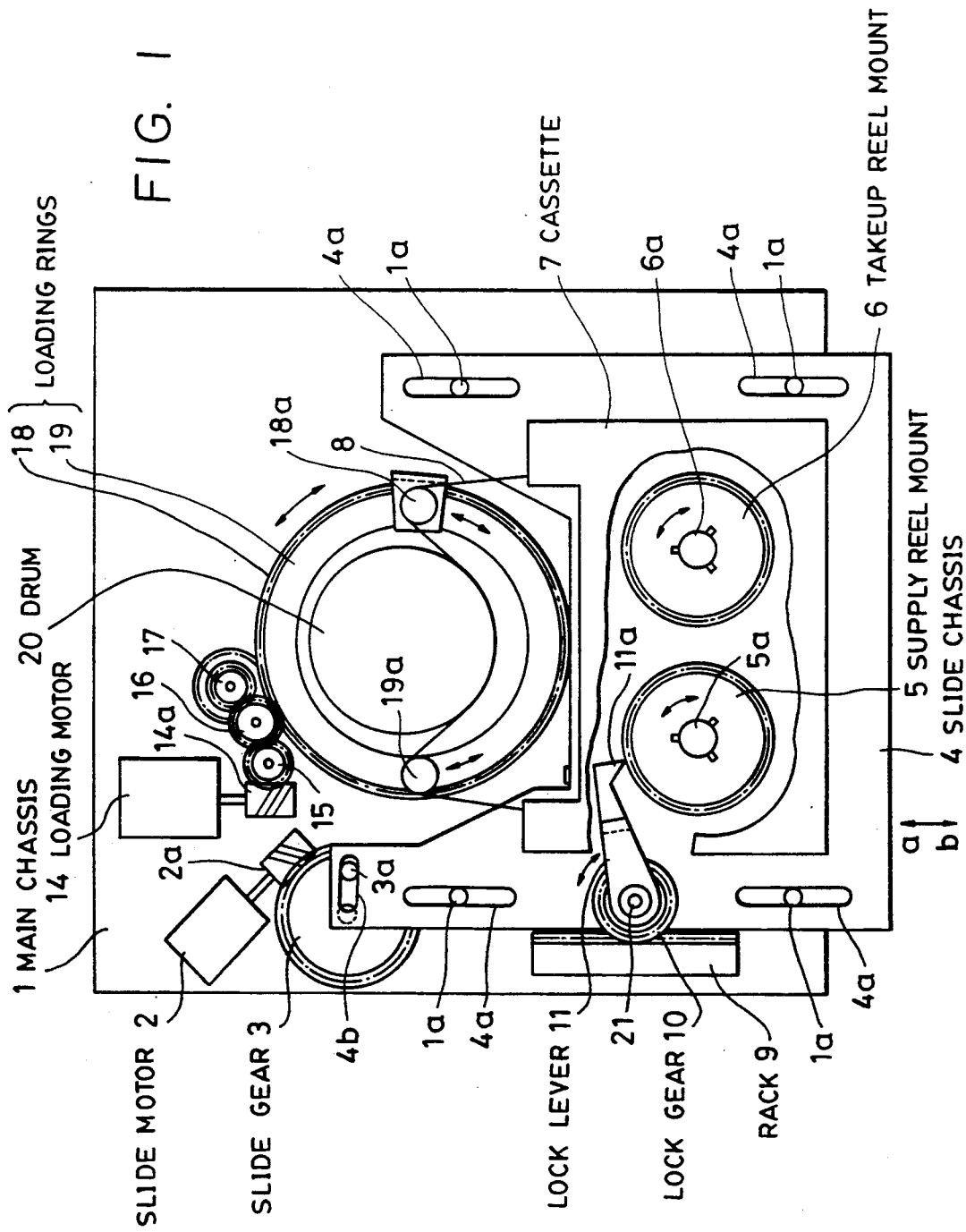

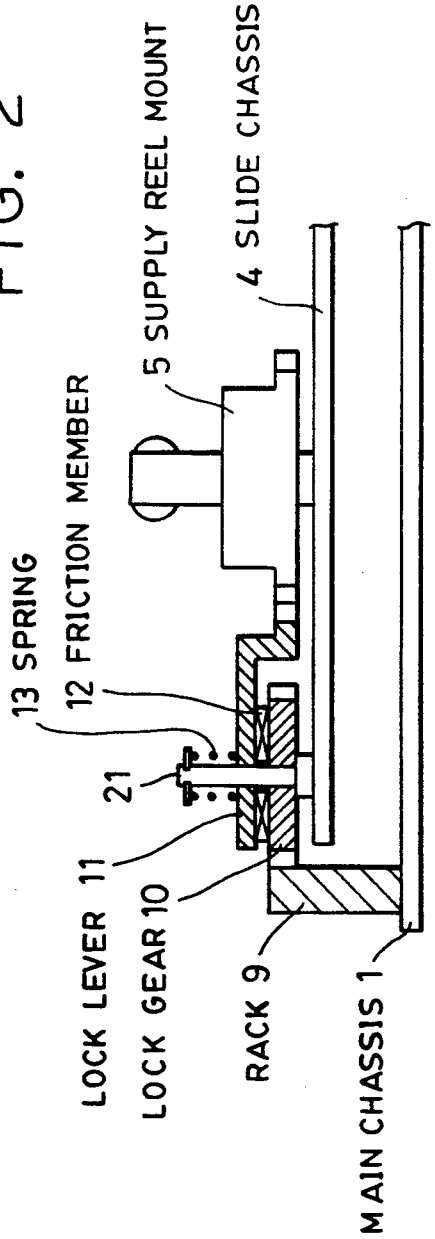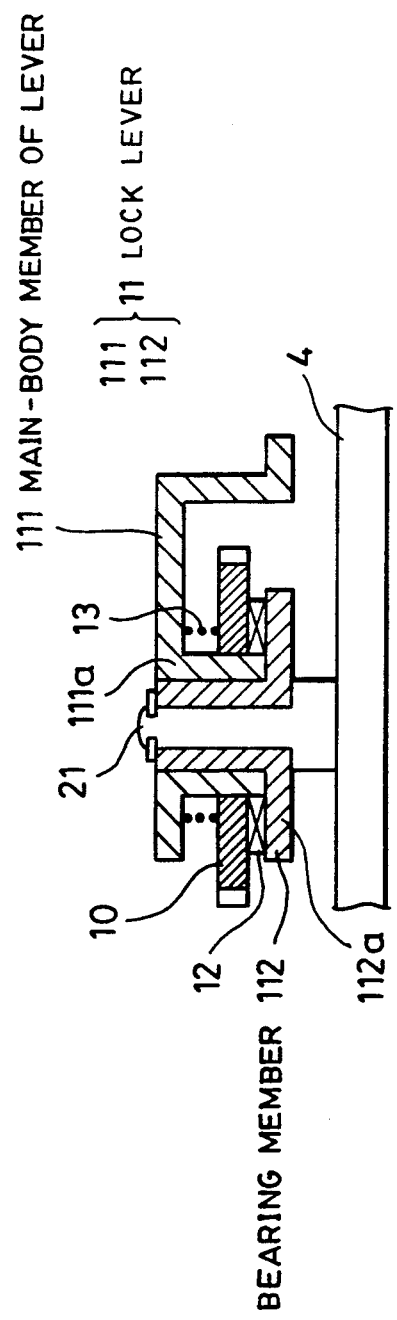

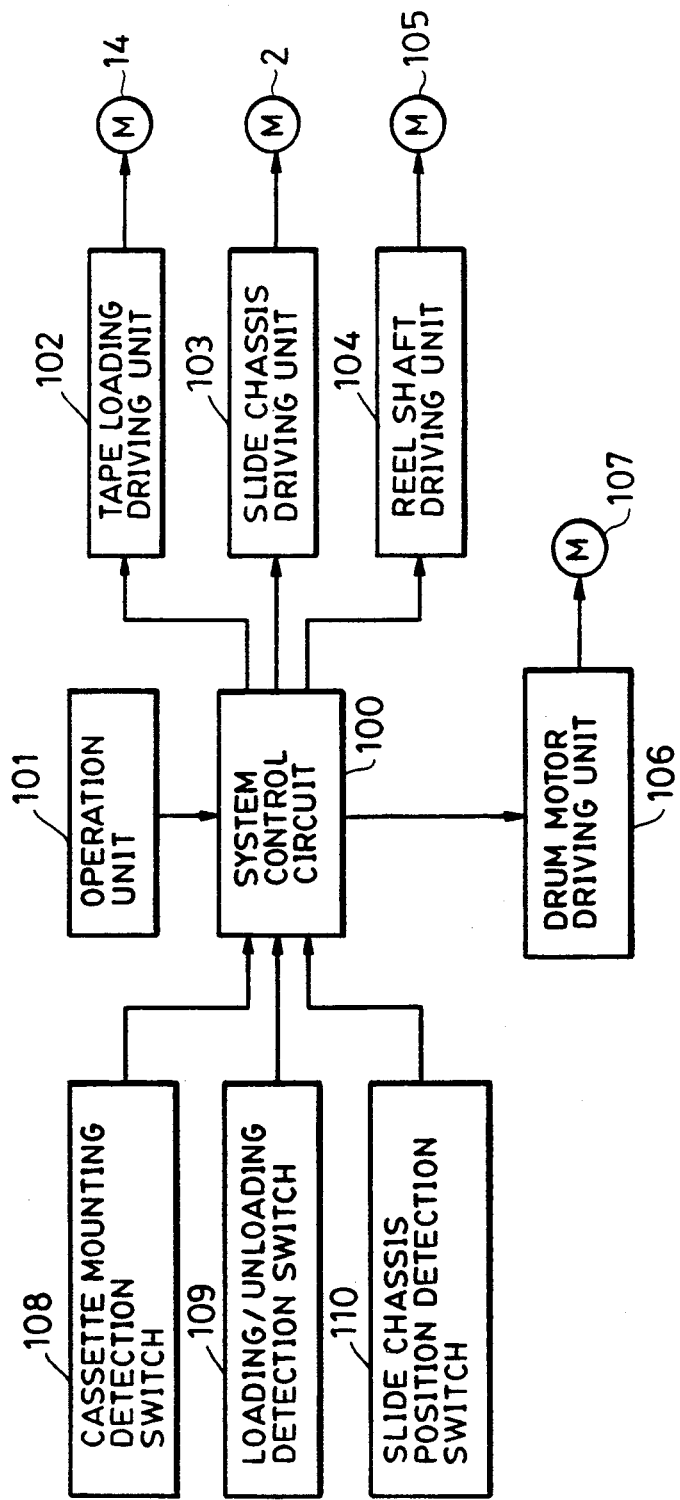

RECORDING OR REPRODUCING APPARATUS HAVING A REEL BRAKING MEMBER

BACKGROUND OF THE INVENTION

1. Field of the Invention

This invention relates to a recording or reproducing apparatus which draws a tape-like recording medium, such as a magnetic tape or the like, out of a cassette and loads the medium around a head.

2. Description of the Prior Art

A VCR (video cassette recorder) has been used as an apparatus which draws a magnetic tape out of a cassette and loads the tape on magnetic heads. That is, in a VCR, a recording or reproducing operation is performed after performing so-called loading in which a magnetic tape is drawn out of a magnetic tape cassette mounted in the VCR, and the magnetic tape is wound around a drum along the outer circumference of which magnetic heads rotate. After the recording or reproducing operation has been terminated, a so-called unloading operation is performed in which the magnetic tape is taken up around a takeup reel in the magnetic-tape cassette to withdraw the tape from the drum. The loading and unloading operations of the magnetic tape are performed by moving tape guides, usually plural in number, which contact and guide the magnetic tape.

Furthermore, the VCR has the configuration in which the magnetic-tape cassette is mounted on a slide chassis slidably provided on a main chassis of the apparatus. The slide chassis is slid in a direction approaching the drum together with the magnetic-tape cassette during the loading operation, and the slide chassis is slid in a direction away from the drum during the unloading operation.

In such a conventional VCR's configuration, a weak brake is applied to a tape supply reel at the moment of the loading and unloading operations of the magnetic tape. To put it concretely, a weak brake is applied to a supply reel mount which receives the supply reel on the slide chassis for mounting the magnetic-tape cassette. The brake is applied so that the magnetic tape is not drawn out of the supply reel during the loading and unloading operations, and thus the loading position of the magnetic tape does not deviate between immediately before the unloading operation and immediately after the next loading operation. Since it is necessary to draw the tape out of the supply reel when the magnetic tape is not wound around the takeup reel, the brake force is set to a weak value so that a sag is not produced in the tape.

In an apparatus as described above, however, there is the problem that, especially during a takeup operation when unloading, the magnetic tape is drawn out by being taken up around the takeup reel from the supply reel during the takeup operation. As a result, the loading position of the magnetic tape before unloading and the loading position of the magnetic tape in the next loading operation are largely deviated from each other, and the deviation between the front end to start the next recording operation and the rear end of the preceding record becomes large. Hence, discontinuous portions are produced in recorded pictures. Furthermore, the amount of the above-described deviation is not constant due to variations in the brake force, torque and time for the takeup operation. Hence, variations in the amount of deviation are large.

SUMMARY OF THE INVENTION

It is an object of the present invention to solve the problems as described above during loading and unloading operations for a tape-like recording medium.

It is another object of the present invention to provide a recording or reproducing apparatus having small deviation in tape loading positions relative to heads in loading and unloading operations.

It is still another object of the present invention to provide a recording or reproducing apparatus capable of smoothly controlling locking and unlocking operations of a reel by being linked with a part of the loading operation of a tape or a cassette by a simple configuration.

These and other objects are accomplished, according to one aspect of the present invention, by a recording or reproducing apparatus which loads a tape-like recording medium by drawing the medium out of a cassette and winding the medium around a head drum, and which unloads the medium by housing the medium wound around the head drum within the cassette. The apparatus comprises a slide chassis movably disposed between a first position capable of mounting the cassette and separated from the head drum, and a second position for accessing the cassette to the head drum. Tape loading means are provided for performing a loading operation by drawing the tape-like recording medium out of the cassette and winding the medium around the head drum in accordance with the movement of the slide chassis from the first position to the second position, and for performing an unloading operation by housing the tape-like recording medium wound around the head drum within the cassette in accordance with the movement of the slide chassis from the second position to the first position. A reel braking member operating linked with a slide operation of the slide chassis is provided for separating itself from a reel mount during the loading operation in which the slide chassis moves to the second position, and for braking the reel mount by engaging it during the unloading operation in which the slide chassis moves to the first position.

According to another aspect, the present invention relates to a recording or reproducing apparatus for loading a magnetic tape by drawing the tape out of a cassette and winding the tape around a head drum, and for unloading the tape by housing the tape wound around the head drum within the cassette. The apparatus comprises cassette conveying means including a cassette loading member movably disposed between a first position capable of mounting the cassette separated from the head drum and a second position for accessing the cassette mounted at the first position to the head drum, and driving means for driving the cassette loading member. Tape loading means are provided for performing a loading operation by drawing the tape out of the cassette and winding the tape around the head drum, and for performing an unloading operation by housing the tape wound around the head drum within the cassette. Control means are provided for controlling the cassette conveying means and the tape loading means, and for performing a loading operation by drawing the tape out of the cassette and winding the tape around the head drum in accordance with the movement of the cassette loading member from the first position to the second position. The control means performs an unloading operation by housing the tape wound around the head drum within the cassette in accordance with the movement of the cassette loading member from the second position to the first position. A reel lock member is also provided and operates linked with a slide operation of the cassette loading member, for separating itself from a reel mount during the loading operation in which the cassette loading member moves to the second position, and for braking the reel mount by engaging it during the unloading operation in which the cassette loading member moves to the first position.

It is still another object of the present invention to provide a recording or reproducing apparatus in which, since a supply reel in a cassette is locked in withdrawing a magnetic tape and the lock is released in loading the magnetic tape, the magnetic tape is not drawn out of the supply reel while withdrawing the magnetic tape, and a deviation between a loading position immediately before withdrawing the magnetic tape and a loading position in the next loading of the magnetic tape is produced only in the amount of the magnetic tape drawn out of the supply reel in the next loading operation.

It is still another object of the present invention to provide a recording or reproducing apparatus mounting a cassette which houses a magnetic tape wound around a supply reel and a winding reel, for performing an operation of moving the cassette in a predetermined direction, drawing the magnetic tape out of the cassette and loading the tape on a magnetic head unit, and for performing an operation of moving the cassette in a direction which is reverse to the above-described direction, drawing the magnetic tape out of the cassette and withdrawing it from the magnetic head unit. The apparatus has a configuration in which there is provided a means for locking the supply reel in the cassette during the withdrawing operation, and for releasing the lock during the loading operation. The means for locking is linked with the movement of the cassette during the loading and withdrawing operations of the magnetic tape. The apparatus thereby has the excellent advantage that the amount of deviation in loading positions of the magnetic tape between immediately before the withdrawing operation and immediately after the next loading operation may be largely reduced, a discontinuous portion between a recorded portion and the next recorded portion on the magnetic tape may also be largely reduced, and hence the user may have the feeling of using a higher-grade magnetic recording or reproducing apparatus.

These and other objects and features of the present invention will become more apparent from the following description made with reference to the accompanying drawings.

BRIEF DESCRIPTION OF THE DRAWINGS

FIG. 1 is a plan view showing the structure of a magnetic-tape loading mechanism in a VCR according to an embodiment of the present invention;

FIG. 2 is a cross-sectional view showing the structure around a lock lever shown in FIG. 1;

FIG. 3 is a cross-sectional view showing the structure of a lock lever made as a unit; and FIG. 4 is a block diagram of a control system in a VCR according to the present invention.

DETAILED DESCRIPTION OF THE PREFERRED EMBODIMENTS

The present invention will now be explained in detail according to preferred embodiments shown in the drawings.

FIGS. 1 and 2 are provided for explaining the structure of a principal part of a VCR according to an embodiment of the present invention. This VCR adopts the structure according to the present invention for a loading mechanism which performs the above-described loading and unloading operations for a magnetic tape. FIG. 1 shows the entire loading mechanism in the VCR. FIG. 2 shows a cross section around the lock lever shown in FIG. 1.

In FIG. 1, the following members are provided on a main chassis 1 of the apparatus.

On a central portion of the main chassis 1, there is provided a rotating-head drum 20, along the outer circumference of which magnetic heads (not shown) are provided at a predetermined interval, and which is rotated at a high speed by a well-known motor, in a state inclined by a predetermined angle.

Also on the central portion of the main chassis 1, loading rings (abbreviated hereinafter "rings") 18 and 19 for performing loading and unloading operations are disposed one above another so as to be rotated independently around the drum 20. Movable tape guide posts 18a and 19a for performing loading and unloading operations while moving in contact with magnetic tape 8 are protruded on the rings 18 and 19, respectively. The rings 18 and 19 are rotated in the clockwise or counterclockwise direction by the drive of a loading motor 14 provided on the main chassis 1 via a gear 14a fixed to an output rotating shaft of the motor and gears 15–17.

The rings 18 and 19 are arranged so as to be rotated in directions which are reverse to each other.

Also on the main chassis 1, a slide chassis 4 is provided so as to be slidable in a direction shown by arrow "a" approaching the drum 20 and in a direction shown by arrow "b" away from the drum 20. Straight long holes 4a are formed at four corners of the slide chassis 4. By slidably fitting four pins 1a protruded from the main chassis 1 into the corresponding long holes 4a, the slide chassis may be slid in the directions "a" and "b".

In order to slide the slide chassis 4, a slide motor 2 and a slide gear 3 are provided on the main chassis 1. The slide gear 3 meshes with a gear 2a fixed to a rotating shaft of the slide motor 2, and is rotated in the clockwise or counterclockwise direction by the drive of the slide motor 2 via the gear 2a. A pin 3a is eccentrically protruded on the slide gear 3, and is slidably fitted in the long hole 4b which is formed straight in a lateral direction in the slide chassis 4. Hence, by the rotation of the slide gear 3, the eccentric pin 3a can move in the directions of arrows "a" and "b" while moving in right and left directions within the long hole 4a, and the slide chassis 4 can move relative to the rotating-head drum.

On the other hand, a magnetic-tape cassette (termed hereinafter a "cassette") 7 housing a magnetic tape 8 wound around and between a supply reel and a takeup reel (not shown) is detachably mounted on the slide chassis 4. A supply reel mount 5 and a takeup reel mount 6 for receiving the supply reel and the takeup reel of the cassette 7, respectively, are rotatably provided on the slide chassis 4. The supply reel and takeup reel of the cassette 7 are mounted on the reel mounts 5 and 6, respectively, when the cassette 7 is mounted on the slide chassis 4, and respective shafts 5a and 6a of the reel mounts 5 and 6 are engaged with the corresponding reels in the cassette 7. By the rotation of the reel mounts 5 and 6 in the clockwise or counterclockwise direction by the drive of a reel driving motor (not shown), the two reels in the cassette 7 rotate to move the magnetic tape 8 in the forward or reverse direction.

In the present invention, a lock lever 11 for locking the supply reel in the cassette 7 at the moment of unloading the magnetic tape 8 and for releasing the lock at the moment of loading the magnetic tape is further provided on the slide chassis 4. The lock lever 11 is pivoted on a shaft 21 protruded from a central portion at the left side of the slide chassis 4, as shown in FIG. 1, so as to be rotatable in the clockwise and counterclockwise directions. By the rotation of the lock lever 11 in the clockwise direction, a claw 11a formed on the distal end of the lever 11, as shown in FIG. 1, presses against the outer circumference of the supply reel mount 5 to lock the supply reel mount 5, and hence the supply reel in the cassette 7 is locked.

In order to drive the lock lever 11 together with the movement of the slide chassis 4, as will be described later, a lock gear 10 is rotatably pivoted on the shaft 21 under the lock lever 11, as shown in FIG. 2. A friction member 12 made of rubber or the like is inserted between the lock gear 10 and the lock lever 11. The lock lever 11 is downwardly pressed by a spring 13, which is elastically mounted around the shaft 21, and is pressed against the lock gear 10 via the friction member 12.

Furthermore, the lock gear 10 meshes with a rack 9 fixed on the main chassis 1.

FIG. 4 shows a control block of the VCR according to the present invention. In FIG. 4, a system control circuit 100 for controlling the entire operation of the VCR comprises a microcomputer and the like. An operation unit 101 includes a plurality of switches for commanding various kinds of operations. A loading motor driving circuit 102 drives the loading motor 14 for performing a tape loading operation. A slide motor driving circuit 103 drives the slide motor 2 for driving the slide chassis 4 in order to move the cassette. A reel motor driving circuit 104 drives a reel motor 105 for rotatably driving the reel mounts 5 and 6. A drum motor driving circuit 106 drives a drum motor 107 for rotating the rotating heads in the head drum 20.

A switch 108 detects the mounting of the cassette on the slide chassis 4. The system control circuit 100 detects the switching-on of the cassette detection switch 108, and enables subsequent various kinds of operations to be controlled.

A switch 109 detects the completion of the tape loading operation and the tape unloading operation by tape loading means from the position of the loading rings 18 and 19, respectively. A switch 110 detects the advanced position of the slide chassis 4 for mounting and conveying the cassette to the side of the head drum, and the retreated position separated from the head drum where the cassette may be unloaded.

The system control circuit 100 controls the drive circuits 102, 103, 104 and 106 for the respective motors and operates the VCR according to commands from the operation unit 101 and information from the respective detection switches.

The loading and unloading operations for the magnetic tape according to the foregoing configuration will now be explained.

FIG. 1 shows a state in the midst of the unloading operation. When the cassette 7 is mounted onto the slide chassis 4 before the loading operation, the slide chassis 4 has been slid in the direction "b" from the position shown in FIG. 1. The mounting of the cassette 7 is detected by the switch 108. The above-described state of the slide chassis 4 is detected by the slide chassis position detection switch 110 shown in FIG. 4. At the moment of mounting the cassette 7, the claw 11a of the lock lever 11 presses against the supply reel mount 5 to lock the supply reel mount 5. Hence, the supply reel in the cassette 7 is locked.

Furthermore, at the moment of mounting the cassette 7, the guides 18a and 19a on the rings 18 and 19 are situated at positions which are lower than the illustrated positions. This state is detected by the switch 109 as an unloading state.

When the detection switch 108 has detected that the cassette 7 was mounted on the slide chassis 4 in this state, the system control circuit 100 starts the loading operation according to a command from the operation unit 101 or automatically. In this state, the slide motor 2 and the loading motor 14 are simultaneously rotatably driven, the slide gear 3 is rotated in the counterclockwise direction in FIG. 1, the ring 18 is rotated in the counterclockwise direction, and the ring 19 is rotated in the clockwise direction. By the rotation of the slide gear 3 in the counterclockwise direction, the pin 3a pushes the slide chassis 4 to slide it in the direction "a".

By the movement of the slide chassis 4 in the direction "a", the gear 10 moves in the same direction and rotates in the counterclockwise direction in FIG. 1 by meshing with the rack 9. The lock lever 11 thereby rotates in the counterclockwise direction, the claw 11a separates from the supply reel mount 5, and hence the lock of the supply reel mount 5 is released. That is, the lock of the supply reel in the cassette 7 is released.

The guides 18a and 19a rotate upwardly in FIG. 1 in accordance with the rotation of the rings 18 and 19, drawing the magnetic tape out of the supply reel and the takeup reel in the cassette 7 which are not braked, and helically winding the tape around the drum 20. The loading operation is thereby completed. The loading position of the loading ring and the advanced position of the slide chassis in the direction "a" are detected by the switches 109 and 110, respectively, and the system control circuit 100 stops the corresponding motors in accordance with the detected signals. When the loading operation has been terminated, the guides 18a and 19a are rotated upwardly from the illustrated positions, and the magnetic tape 8 is mounted wound around the drum in the shape of $\Omega$.

At the moment of a recording or reproducing operation after the end of the loading operation, the system control circuit 100 drives the drum motor 107 via the drum motor driving circuit 106 to rotate the head drum, and also rotates the reel motor 105 via the reel shaft driving circuit 104. The takeup reel mount 6 is thereby rotated in the clockwise direction, and the takeup reel in the cassette 7 is rotated in the same direction to take up and convey the magnetic tape 8. At the same time, the magnetic heads in the drum 20 rotate and make sliding contact with the magnetic tape 8 to perform the recording or reproducing operation.

Subsequently, for an unloading operation after the end of the recording or reproducing operation, the slide motor 2 and the loading motor 14 are rotatably driven in a direction reverse to the direction of the loading operation by the system control circuit 100. The slide gear 3 is rotated in the clockwise direction in FIG. 1, and the rings 18 and 19 are rotated in the clockwise and counterclockwise directions, respectively. By the clockwise rotation of the slide gear 3, the slide chassis 4 is slid in the direction "b" via the pin 3a. Linked with this slide movement, the lock gear 10 is rotated in the clockwise direction, the lock lever 11 is rotated in the same direction, and the claw 11a of the lock lever 11 presses against the outer circumference of the supply reel mount 5. The supply reel mount 5 is thereby locked, and the supply reel in the cassette 7 is also locked. By the rotation of the rings 18 and 19, the guides 18a and 19a rotate toward lower positions in FIG. 1. Together with the above-described movements, the takeup reel mount 6 is rotated in the clockwise direction by the drive of the reel motor 105 shown in FIG. 4, the takeup reel in the cassette 7 is thereby rotated in the same direction, and the magnetic tape 8 is withdrawn from the drum 20 by being taken up around the takeup reel.

Since the supply reel in the cassette 7 is locked during the withdrawing operation, the magnetic tape 8 is not drawn from the supply reel by the rotation of the takeup reel. Accordingly, deviation between the loading position of the magnetic tape 8 immediately before this unloading operation and the loading position of the magnetic tape 8 immediately after the next loading operation is only the amount of the magnetic tape drawn from the supply reel in the cassette 7 at the moment of the next loading operation. Hence, the amount of deviation is very small, and variations in the amount also become small. The completion of the unloading operation is detected from the positions of the loading ring and the slide chassis by the switches 109 and 110, respectively, and the respective motors are stopped by the system control circuit 100.

Thus, according to the present embodiment, it is possible to largely reduce the amount of deviation between the respective loading positions of the magnetic tape immediately before the unloading operation and immediately after the next loading operation, and also to largely reduce discontinuous portions in recorded pictures.

Although, in the above-described configuration, the loading motor 14 and the slide motor 2 are simultaneously rotatably driven during the loading and unloading operations, the slide motor 2 may be rotated first followed by the rotation of the loading motor 14. Furthermore, before the guides 18a and 19a contact the magnetic tape in the loading operation, the loading motor 14 may be rotated before the rotation of the slide motor 2. Moreover, after rotating the slide motor 2, the slide chassis 4 may be slid by a predetermined amount and then stopped. Subsequently, after moving the guides 18a and 19a by rotating the loading motor 14, the slide motor 2 may be driven again to perform slide movement. In addition, it is possible to adopt a configuration in which the slide movement of the slide chassis 4 and the rotation of the rings 18 and 19 are performed by a single motor.

Furthermore, by performing the locking operation by rotating the lock lever 11, which is separated from the supply reel mount 5 to unlock it, in the clockwise direction with a desired timing by other appropriate driving means (not shown) during recording or reproducing operation in the above-described configuration, it is also possible to utilize the lock lever 11 as a main brake for a stop operation.

It is also possible to provide the lock gear 10, the lock lever 11, the friction member 12 and the spring 13 as a unit by adopting the structure as shown in FIG. 3. In this case, the lock lever 11 is divided into a main-body member 111 of the lever and a bearing member 112. The bearing member 112 is formed in the shape of a cylinder corresponding to the shaft 21, and a flange portion 112a is formed at its lower portion. A cylindrical fitting portion 111a, in which the bearing member 112 is fitted by being squeezed, is also formed at an end portion of the main-body member 111 of the lever. By squeezing and fitting the bearing member 112 into the fitting portion 111a of the main-body member 111 of the lever, the bearing unit 112 and the main-body unit 111 of the lever are made as a unit. Before unifying the two members, the spring 13, the lock gear 10 and the friction member 12 are inserted between the main-body member 111 of the lever and the flange portion 112a of the bearing member 112. The lock gear 10 is rotatably pivoted by the fitting portion 111a of the main-body member 111 of the lever, and is pressed against the flange portion 112a of the bearing member 112 via the friction member 12 by the pressure of the spring 13.

By thus making the members 10-13 as a unit, it is possible to simplify the assembly process of the VCR.

In the structure shown in FIG. 3, however, the number of components increases by one and the entire height of the assembled body made of the members 10-13 becomes larger than in the structure shown in FIG. 2. Accordingly, the structure shown in FIG. 2 is advantageous when it is desired to provide a thin apparatus.

As is apparent from the above-described explanation, according to the present invention, it is possible to provide a recording or reproducing apparatus mounting a cassette having a magnetic tape wound around a supply reel and a takeup reel, which performs an operation of moving the cassette in a predetermined direction, drawing the magnetic tape out of the cassette and loading the tape on a magnetic head unit. The apparatus also performs an operation of moving the cassette in a direction which is reverse to the above-described direction, taking up the tape around the takeup reel in the cassette and withdrawing the tape from the magnetic head unit. The present invention features a configuration in which there is provided a means for locking the supply reel in the cassette during the withdrawing operation, and for releasing the lock during the loading operation where the locking and unlocking are linked with the movement of the cassette during loading and withdrawing operations of the magnetic tape. The apparatus thereby has the excellent effects that the amount of deviation in loading positions of the magnetic tape immediately before the withdrawing operation and immediately after the next loading operation may be largely reduced, a discontinuous portion between a recorded portion and the next recorded portion on the magnetic tape may also be largely reduced, and hence the user may have the feeling of using a higher-grade magnetic recording or reproducing apparatus.

What is claimed is:

1. A recording or reproducing apparatus for loading a tape-like recording medium by drawing the medium out of a cassette and winding the medium around a head drum, and for unloading the medium by drawing the medium wound around said head drum into said cassette, said apparatus comprising:

(A) a slide chassis movably disposed between a first position where said cassette may be mounted separated from said head drum and a second position for accessing the cassette to said head drum, said slide chassis including a pair of reel mounts;

(B) tape loading means for performing a loading operation by drawing the tape-like recording medium out of said cassette and winding the medium around the head drum in accordance with a movement of said slide chassis from said first position to said second position, and for performing an unloading operation by drawing the tape-like recording medium wound around said head drum into said cassette in accordance with the movement of said slide chassis from said second position to said first position; and (C) a reel braking member provided on said slide chassis and moving in response to a slide operation of said slide chassis, said reel braking member separating itself from one of said reel mounts during the loading operation in which said slide chassis moves to said second position, and for braking said one reel mount by engaging it during the unloading operation in which said slide chassis moves to said first position.

2. A recording or reproducing apparatus according to claim 1, wherein said pair of reel mounts comprises a takeup reel mount and a supply reel mount rotatably disposed on said slide chassis together with a reel driving mechanism thereof, and wherein said reel braking member brakes said supply reel mount by engaging with it.

3. A recording or reproducing apparatus according to claim 2, wherein said tape loading means loads the tape-like recording medium around said head drum by drawing the tape-like recording medium from both said supply reel mount and said takeup reel mount when the tape loading operation is performed, and when said reel braking member brakes said supply reel mount, said tape loading means takes up the tape-like recording medium on said takeup reel mount when the unloading operation is performed.

4. A recording or reproducing apparatus according to claim 3, wherein said reel braking member includes:
(A) a reel lock lever, one end of which is rotatably mounted on said slide chassis with a rotatable gear coaxially disposed via a friction member, and another end of which is engageable with said supply reel mount; and
(B) a rack disposed at a side of said apparatus close to said slide chassis and meshed with said gear, and wherein said rack rotates said gear linked with the slide operation of said slide chassis and transmits rotation force to said reel lock lever via said friction member.

5. A recording or reproducing apparatus according to claim 1, wherein said slide chassis and said tape loading means are driven by different driving systems, respectively.

6. A recording or reproducing apparatus according to claim 1, further comprising cassette mounting members for mounting said cassette and formed on said slide chassis, and wherein said cassette may be detached at said first position of said slide chassis.

7. A recording or reproducing apparatus according to claim 6, further comprising a reel mount driving mechanism for driving said pair of reel mounts and disposed on said slide chassis.

8. A recording or reproducing apparatus for loading a magnetic tape by drawing the tape out of a cassette and winding the tape around a head drum, and for unloading the tape wound around said head drum by drawing the tape into the cassette, said apparatus comprising:

(A) cassette conveying means comprising (1) a cassette loading member movably disposed between a first position where the cassette may be mounted separated from said head drum and a second position for accessing the cassette to said head drum, (2) a pair of reel mounts for winding the tape in the cassette, and (3) driving means for driving said cassette loading member;

(B) tape loading means for performing a loading operation by drawing the tape out of the cassette and winding the tape around the head drum, and for performing an unloading operation by drawing the tape wound around said head drum into the cassette;

(C) control means for controlling said cassette conveying means and said tape loading means, and for performing the loading operation by drawing the tape out of the cassette and winding the tape around the head drum in accordance with a movement of said cassette loading member from said first position to said second position, and for performing the unloading operation by drawing the tape wound around said head drum into the cassette in accordance with a movement of said cassette loading member from said second position to said first position; and (D) a reel lock member provided on said cassette conveying means and linked with a slide operation of said cassette loading member, for, based on a sliding direction of said cassette loading member, separating itself from one of said reel mounts during the loading operation in which said cassette loading member moves to said second position, and for braking said one reel mount by engaging it during the unloading operation in which said cassette loading member moves to said first position.

9. A recording or reproducing apparatus according to claim 8, wherein said pair of reel mounts comprises a takeup reel mount and a supply reel mount disposed on said cassette loading member together with a reel driving mechanism thereof, and wherein said reel lock member brakes said supply reel mount by engaging with it.

10. A recording or reproducing apparatus according to claim 9, wherein said tape loading means loads the tape around said head drum by drawing the tape from both said supply reel mount and said takeup reel mount when the tape loading operation is performed, and when said reel lock member brakes said supply reel mount, said tape loading means takes up the tape on said takeup reel mount when the unloading operation is performed.

11. A recording or reproducing apparatus according to claim 10, wherein said reel lock member includes:
(A) a reel lock lever, one end of which is rotatably mounted on said cassette loading member with a rotatable gear coaxially disposed via a friction member, and another end of which is engageable with said supply reel mount; and
(B) a rack disposed at a side of said apparatus close to said cassette loading member and meshed with said gear, and wherein said rack rotates said gear linked with the slide operation of said cassette loading member and transmits rotation force to said reel lock lever via said friction member.

12. A recording or reproducing apparatus according to claim 8, wherein said cassette loading member and said tape loading means are driven by different driving systems, respectively.

13. A recording or reproducing apparatus according to claim 8, further comprising a cassette mounting member for mounting said cassette and formed on said cassette loading member, and wherein said cassette may be detached at said first position of said cassette loading member.

14. A recording or reproducing apparatus according to claim 13, further comprising a reel mount driving mechanism for driving said pair of reel mounts and disposed on said cassette loading member.

* * * * *

UNITED STATES PATENT AND TRADEMARK OFFICE
CERTIFICATE OF CORRECTION

PATENT NO. : 5,153,790
DATED : October 6, 1992
INVENTOR(S) : KOBAYASHI ET AL.

It is certified that error appears in the above-identified patent and that said Letters Patent is hereby corrected as shown below: On the title page: Item [56]

References Cited

Insert: --Attorney, Agent, or Firm - Fitzpatrick, Cella, Harper & Scinto--.

COLUMN 1

Line 63, "record" should read --record operation--.
Line 66, "time" should read --the time--.
Line 18, "magnetic tape cassette" should read --magnetic-tape cassette--.

Signed and Sealed this

Sixteenth Day of November, 1993

Attest:

BRUCE LEHMAN

Attesting Officer

Commissioner of Patents and Trademarks